United States Patent [19]
Matthews et al.

[11] Patent Number: 4,874,623
[45] Date of Patent: Oct. 17, 1989

[54] METHOD FOR MAKING A COEXTRUDED MEAT PRODUCT

[75] Inventors: Bernard T. Matthews, Norwich; David J. Joll, Holt; Habeeb M. Ziauddin, Norwich, all of England

[73] Assignee: Bernard Matthews plc, England

[21] Appl. No.: 293,810

[22] Filed: Jan. 5, 1989

Related U.S. Application Data

[63] Continuation of Ser. No. 8,332, Jan. 29, 1987, abandoned.

[30] Foreign Application Priority Data

Mar. 21, 1986 [GB] United Kingdom ............... 8607103

[51] Int. Cl.⁴ ........................... A23L 1/31; A23P 1/12
[52] U.S. Cl. .................................. 426/272; 426/302; 426/513; 426/641
[58] Field of Search ................ 426/272, 302, 641, 513

[56] References Cited

U.S. PATENT DOCUMENTS

| | | |
|---|---|---|
| 4,340,994 | 7/1982 | Dos Santos et al. ............... 17/45 |
| 4,539,210 | 9/1985 | O'Connell et al. ............... 426/56 |
| 4,728,524 | 3/1988 | Gagliardi ............... 426/272 |

FOREIGN PATENT DOCUMENTS

| | | |
|---|---|---|
| 46177 | 2/1986 | Australia . |
| 0011402 | 7/1982 | European Pat. Off. . |
| 0024790 | 9/1982 | European Pat. Off. . |
| 0153024 | 8/1985 | European Pat. Off. . |
| 0175397 | 3/1986 | European Pat. Off. . |
| 03317 | 3/1986 | Netherlands . |
| 2085275 | 4/1982 | United Kingdom . |
| 2156650 | 10/1985 | United Kingdom . |

*Primary Examiner*—Arthur L. Corbin
*Attorney, Agent, or Firm*—Oliff & Berridge

[57] ABSTRACT

A meat product consisting of a meat core and a fat outer layer is made by coextrusion of small thin slices of lean meat and fatty material. Prior to extrusion the thin slices are coated with meat glue. The coextrudate is case hardened and cut to the desired length.

4 Claims, 4 Drawing Sheets

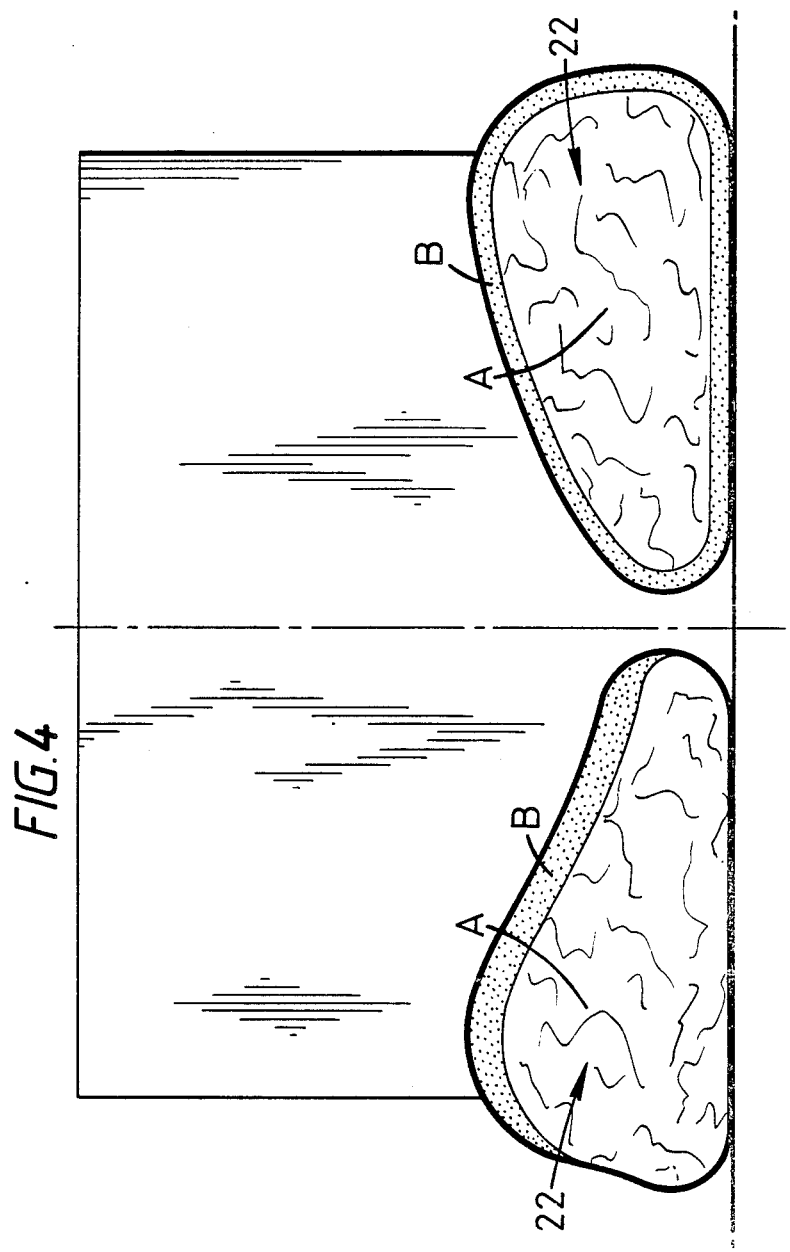

METHOD FOR MAKING A COEXTRUDED MEAT PRODUCT

This is a continuation division of application Ser. No. 07/008,332 filed Jan. 29, 1987, now abandoned.

This invention relates to an improved meat-based product and to a method and apparatus for producing the product.

Our European Patents Nos. 0,011,402B, 0,024,790B and European published Application No. 0,153,024A all are concerned with whole muscle-meat products which have an outer layer of fat. Such products have, as an integral part, a flexible outer casing simulating the skin of a natural cut and this outer casing is a production necessity to contain the forces generated during extrusion of whole-muscle meat. The application of the casing needs an operator and precludes a truly continuous process.

U.S. Pat. No. 4,539,210 a structured meat product, formed by coextrusion, comprising a lean portion and a fat rim. The starting material for the lean portion consists of chunks of meat of substantial size but with the muscle scaffold network severed. The chunks are mechanically massaged to release adhesive protein and are aggregated into a mass prior to forming. U.K. published application No. 2,156,650A discloses a restructured meat product formed by kneading thin slices of meat into a compacted mass and then forming the kneaded mass into the product, the product being held together by the adhesive nature of the meat juices and the entanglement of the slices, both arising from the kneading process. There is no fatty portion.

The objective of the present invention is to provide a structured product comprising a meat layer and a fat layer which can be produced in a continuous process but which has the texture and taste of a whole-muscle product.

A process in accordance with the present invention comprises the following steps:

(1) Slicing whole-muscle meat into small thin slices. Typically the slices will be between 1.5 and 5 mm thick the thinner end of the range being preferred; 1.5 mm is a good working thickness. With regard to lateral dimension we have found it convenient to have slices in the region of 120 mm square but a range of between 50 to 150 mm can be contemplated. In fact the preferred 120 mm square will typically have one or more muscle or sinew lines in it and slice will divide along that line(s) of weakness during the next working stage of the process. For successful working of the process the slices should be cold, just below 0° C. It is thus advantageous to slice from a whole-muscle piece just sufficiently thawed from frozen solid to be slicable, and to convey the cold slices to the next stage of the process in the cool ambient conditions of meat processing so that the slices remain cold up to and through the extrusion process.

(2) The thin slices are then agitated in admixture with a meat-based adhesive liquid for a short period until the slices are coated with the liquid. During this agitation the slices will tend to divide along any lines of weakness into smaller slices so there is a certain reduction of mean slice size during this process. The agitation typically only takes place for of the order of 2 minutes so there is no substantial release of protein or other material from the slice. The purpose of this step is essentially to coat each slice with a meat based adhesive. The slices are discharged from the mixer and, although being adhesive-coated with a certain tendency to stick to one another, they remain separate slices as opposed to a compacted mass.

(3) The coated slices are then loaded into a coextrusion machine and pumped through to the extrusion head. A fat-forming fluid is also loaded into the machine and pumped through to another region of the extrusion head; this fluid is preferably an emulsified mixture of fat and meat.

(4) The coextrudate of fat and meat in the form of the desired cut of meat is discharged from the extrusion head onto a moving conveyor.

(5) The coextrudate is then conveyed through an elongate freezer to be case-hardened into a partially frozen log which is cut into pieces of the desired length.

The process set out above is a complete integrated process from slicing through to case-hardened joints which are then finally frozen to the desired solid form.

The invention will now be described by way of example and with reference to the accompanying drawings wherein;

FIG. 4 is a sectional view indicating different forms of product in accordance with the invention.

Figure 1:
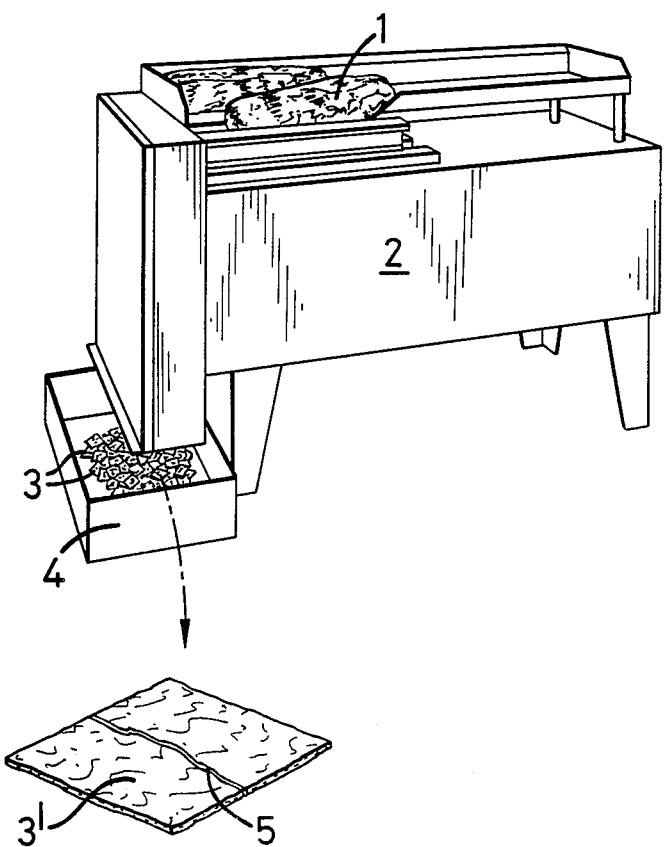
FIG. 1 shows the slicing process together with, on an enlarged scale a typical slice.

Referring initially to FIG. 1 large frozen joints 1 of whole-muscle mainly lean meat typically lamb or beef are allowed to soften from solid till just cuttable and are placed in a proprietary slicing machine 2 which makes straight oriented cuts through the joint and thus discharges small slices 3 of meat into discharge containers 4. As an alternative whole-muscle meat may be cut at ambient temperature and the slices cooled. It is, however, important to have the slices cooled to just below 0° C. for coextrusion to enhance compaction. The typical small slice 3' illustrated on the enlarged scale is 120 mm square and 1.5 mm thick. A natural line of weakness 5 approximately bisects the slice.

Figure 2:
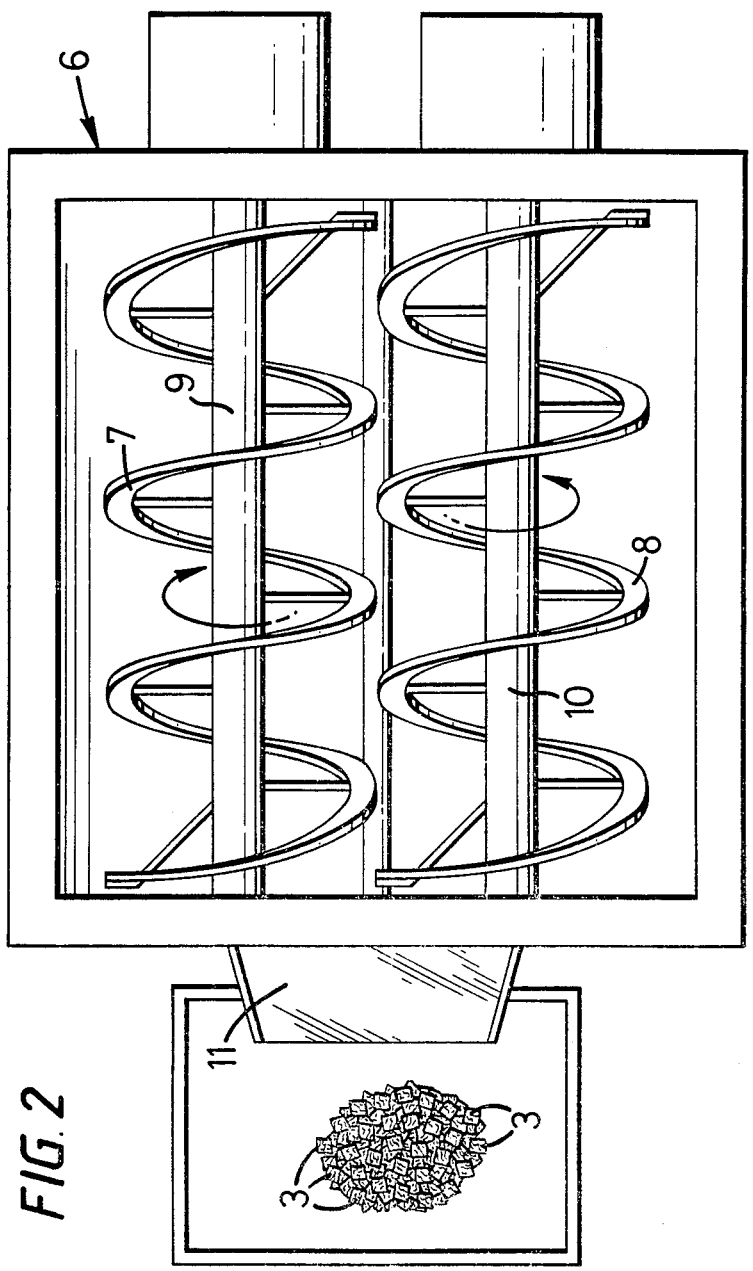
FIG. 2 is a plan view of the agitating and coating step.

Referring now to FIG. 2 the small slices 3 are then prepared for coextrusion by mixing them in a screw mixer 6 with a relatively small amount of a meat glue which is a thick fluid emulsified formulation based on lean meat with released adhesive protein. A typical formulation is emulsified to a thick porridge-like consistency from a mixture of meat pieces (approximately 50%), salts and water. As illustrated the mixer comprises two contra-rotating ribbons 7 and 8 each arranged in a helix around a respective drive shaft 9, 10 so that the ingredients are propelled in one direction by one helix and in the other direction by the other. The mixer 6 also includes an exit port 11 for coated slices 3. The coated slices 3 have a tendency to stick to one another but retain their separate identity. There is no significant discharge of protein from the slices during the short mixing period, typically two minutes. During the mixing the slice 3' of FIG. 1 and other like it will divide into two small slices along the line of weakness 5.

Figure 3:
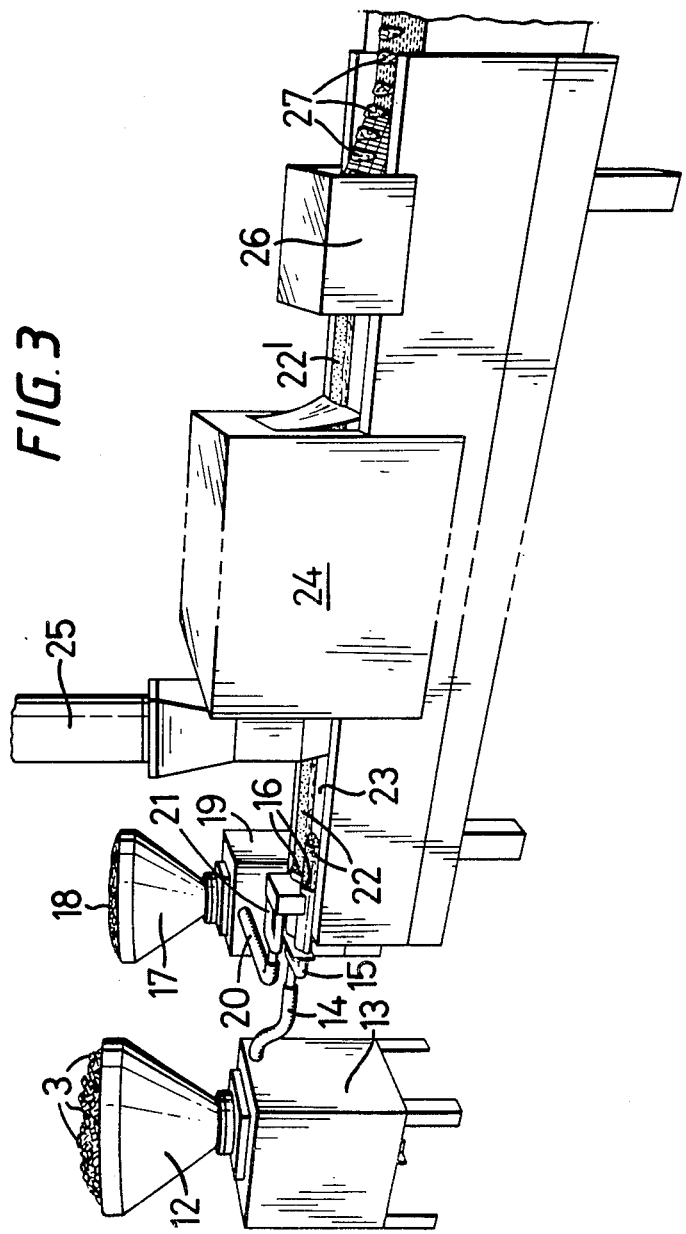
FIG. 3 is a schematic indication of the extrusion head and production line.

Turning now to FIG. 3 the coated slices 3 are loaded whilst still cold into a hopper 12 feeding a pump 13 connected by a pipe 14 to the inlet manifold 15 of twin extrusion heads 16. A second hopper 17 is loaded with a fatty formulation 18, typically being an emulsified mixture of approximately 50% fat proper with lean meat pieces and other extenders. Such an emulsified formulation is a thick viscous liquid of porridge-like consistency which, when extruded, produces an effective simulation of the natural fat layer on meat capable of being retained by the meat body before, during and after cooking. This emulsified formulation may include some adhesive protein material. The second hopper 17 feeds a pump 19 and feeds extrusion head 16 through a pipe 20 and manifold 21.

Each coextrusion head 16 comprises a main part shaped to extrude a simulation of the assymetric main lean body of a natural cut of meat and a peripheral section shaped to extrude the fat layer of that cut. Different extrusion profiles will be described with reference to FIG. 4. FIG. 3 shows coextrusion in full operation from one head 16 and interrupted from the other with the emerging extrudate 22 comprising a lean body of compacted lean slices and a fat outer layer. The extrudate 22 is discharged onto a moving conveyor surface 23 synchronised to advance at the speed of extrusion thereby avoiding distortion of the emerging extrudate. The extrudate 22 on emerging is compacted with structural integrity but is relatively soft. The lean slices subjected to the forces of pumping to and through the extrusion head have undergone some restructuring and combination. The extrudate then passes through an elongate freezing tunnel 24 with a chimney connection 25 for nitrogen refrigerant. The freezer 24 is elongate to a sufficient length but is illustrated in shortened form.

The continuous extrudate passes through the nitrogen freezer 24 and emerges as a case-hardened log 22' suitable for cutting. The case-hardened log then passes through a cutter diagrammatically referenced as 26. The cutter preferably comprises a blade swinging transversely of the direction of advance. The cut pieces or chops 27 emerge to be conveyed to a final freezer (not shown).

The process is an integrated and continuous one. The slices are cold from cutting and are coated with adhesive and loaded into the extrusion means whilst still cold. This presents no production problem in the cool ambient conditions of a meat processing factory.

FIG. 4 is a notional view showing extrudate emerging from side-by-side but different extrusion heads each with an emerging extruded product in accordance with the invention. Thus the extrudate 22 on the left hand side has a body or core A of lean compacted slices, this core being assymetric generally simulating the shape of a chop with a flat base, rounded ends and deeper at one side than another. Typical overall dimensions are 18 cm wide and 8 cm maximum height. The product also includes an upper layer of fat B, maximum depth typically 2 cm, simulating the natural fat on a chop. The right hand of the extrudate shows the layer B of fat may be continued completely around the meat core with a reduced depth of coating. This right hand product can be produced as a right cylinder of meat with a concentric fat annular outer layer. When producing this product the conveyor surface should be covered by a protective material such as plastic sheet dispensed from a roll to avoid damaging the fat underlayer until case hardened.

On eating it is found that the meat product produced by the method set out above closely simulates in texture and taste a high quality chop of whole muscle meat. This similarity arises from the use of thin slices as a starting material for the lean core. The slices are not oriented in the product nor are they readily distinguishable individually. Compaction and restructuring would appear to take place during the coextrusion process.

We claim:

1. A method of manufacturing a meat product comprising a lean meat core and a fatty outer layer, comprising the steps of:
    (a) forming thin cold slices of lean whole-muscle meat;
    (b) agitating said thin cold slices in admixture with a fluid adhesive based on lean meat for a short period sufficient to coat the slices with adhesive but neither to cause significant discharge of protein from the slices nor to compact the slices into a mass;
    (c) loading the slices into hoppers and thereafter pumping the slices to and through one section of an extrusion head to thereby compact and restructure the slices into a non-oriented simulation of lean whole-muscle meat;
    (d) pumping a fatty substance to and through another section of the extrusion head so that a coextrudate of non-oriented meat and fat emerges;
    (e) conveying the coextrudate through an elongate freezer to case harden the coextrudate into a partially frozen log; and
    (f) cutting the log into relatively short lengths.

2. A method according to claim 1 wherein the slices are from a thawed whole-muscle joint and conveyed to the agitating step while still cold, and the coated slices while still cold, are pumped through the extrusion head.

3. A method according to claim 1 wherein the slices are agitated with a relatively small proportion of an emulsified mixture containing lean meat and adhesive protein liberated from the meat.

4. A method according to claim 1 wherein the agitating is carried out in a screw mixer.

* * * * *